United States Patent Office 2,865,940
Patented Dec. 23, 1958

2,865,940

PROCESS FOR PREPARING SATURATED ALIPHATIC DIISOCYANATES

John F. Nobis and Harry Greenberg, Cincinnati, Ohio, assignors to National Distillers and Chemical Corporation, New York, N. Y., a corporation of Virginia No Drawing. Application December 14, 1954
Serial No. 475,293

2 Claims. (Cl. 260—453)

This invention relates to novel methods for the preparation of organic diisocyanates of the aliphatic class, and particularly to the $C_8$ and $C_{10}$ saturated aliphatic diisocyanates as new compositions of matter.

It is an object of this invention to provide a practical and effective method for preparing $C_8$ and $C_{10}$ aliphatic diisocyanates from readily available raw materials.

It is a further object to selectively react butadiene to obtain disodiooctadienes, carbonate these unsaturated derivatives to obtain a mixture of $C_{10}$ unsaturated acids, react the resulting diacid products with suitable reagents to form $C_8$ and $C_{10}$ diamines and convert these diamines to the corresponding diisocyanates by reaction with phosgene.

It is a more particular object of this invention to selectively dimerize 1,3-butadiene using finely dispersed sodium in the presence of an ether reaction medium to obtain disodiooctadienes, thereafter carbonate these products, hydrogenate the resulting ten carbon atom diacids and convert the resulting saturated diacids to eight and ten carbon atom diamines, and thence to the corresponding diisocyanates.

Initially, an aliphatic conjugated diolefin is treated with finely dispersed sodium or potassium in a selected liquid ether medium and, if desired, in the presence of a relatively small amount of polycyclic aromatic hydrocarbon and/or in the presence of a selected solid, friable, attrition agent at controlled temperatures. The reaction products obtained by the selective dimerization reaction are then carbonated at a temperature below 0° C., to give the salts of the dicarboxylic acids. The diacids are further reacted, after hydrogenation, with an appropriate nitrogen-containing reactant to yield the desired nitrogen-containing derivatives.

For example, the diacids can be converted to the diamides by reaction with ammonia and/or urea or other ammonia producing or ammonia releasing materials. These diamides are then converted to aliphatic diamines of 2 less carbon atoms or mixtures of such diamines by reaction with alkaline hypohalite solutions.

On the other hand, the diacids can be converted by reaction with ammonia and/or urea under the proper reaction conditions, directly to the corresponding dinitriles. These dinitriles are subsequently hydrogenated to diamines.

From the diamines, the corresponding diisocyanates are prepared by controlled reaction with phosgene.

If butadiene is the aliphatic diolefin starting material, there results from this method a mixture of $C_8$ or $C_{10}$ diisocyanates. The diisocyanate products obtained by this synthesis constitute compounds in which the two isocyanate groups (NCO) are separated by 4, 6, 8 or 10 carbon atoms. If some other, higher molecular weight diolefin is employed in the initial reaction, then the structure of the final products will vary accordingly.

The generalized formula for these $C_8$ and $C_{10}$ diisocyanates is as follows:

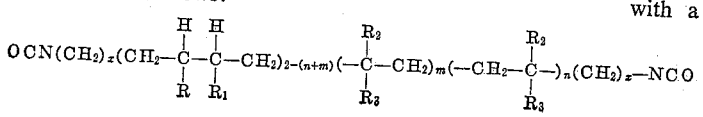

In the above formula, the letters $n$, $m$ and $x$ represent either 0 or 1; and R, $R_1$, and $R_2$ represent either an alkyl, aryl, aralkyl or alkaryl group or a hydrogen atom and $R_3$ represents an alkyl group.

Using the outlined series of reactions and starting with butadiene, a number of diisocyanates were prepared from sebacic acid, α-ethylsuberic acid, and α,α'-diethyladipic acid. The specific diisocyanate compounds prepared are those corresponding to the following formulas:

(1) $OCN-CH_2CH_2CH_2CH_2CH_2CH_2CH_2CH_2-NCO$ 1,8-diisocyanooctane (2) $OCN-CH_2CH_2CH_2CH_2CH_2CHCH_2CH_3$
           |
           NCO 1,6-diisocyanooctane (3) $CH_3CH_2CHCH_2CH_2CHCH_2CH_3$
         |              |
         NCO          NCO 3,6-diisocyanooctane (4) $OCN-CH_2CH_2CH_2CH_2CH_2CH_2CH_2CH_2CH_2CH_2-NCO$ 1,10-diisocyanodecane (5) $OCN-CH_2CHCH_2CH_2CH_2CH_2CH_2CH_2-NCO$
              |
              $CH_2$
              |
              $CH_3$ 2-ethyl-1,8-diisocyanooctane (6) $OCN-CH_2CHCH_2CH_2CHCH_2-NCO$
              |             |
              $CH_2$      $CH_2$
              |             |
              $CH_3$      $CH_3$ 2,5-diethyl-1,6-diisocyanohexane The above listed specific diisocyanates have been isolated and identified. Compounds numbered 2, 3, 5, and 6 are believed to constitute heretofore unknown compositions of matter and it is intended to identify them and claim them as such.

Mixtures of $C_8$ diisocyanates comprising essentially compounds above numbered 1, 2, and 3 are obtained by a process herein described. Mixtures of $C_{10}$ diisocyanates comprising essentially compounds above numbered as 4, 5, and 6 are also obtained by a process herein described.

The preparation of the diisocyanates is carried out by the controlled reaction of phosgene with the corresponding diamines, preferably in the form of their salts such as the hydrochlorides, or the like. In some cases, the carbonates and other salts may be used. Since the diamine dihydrochlorides are generally insoluble, in the preferred liquid reaction media, it is therefore quite desirable to employ these solid salts as finely divided materials in order to achieve reasonable reaction rates.

In carrying out the reaction of the diamines or their equivalent salts, with phosgene, it is generally necessary to employ elevated temperatures. If desired, the amine salts can be reacted with phosgene at temperatures up to 250°–300° C. This forms intermediate carbamyl chlorides which are then decomposed with a base, for example, lime.

It is preferred, however, to use relatively high boiling, inert solvents as media for the reaction. This technique avoids the use of lime for decomposition.

Since completion of the reaction to obtain the diisocyanates depend on the decomposition of the intermediate carbamyl chlorides, there must be used an inert solvent with a boiling point high enough to accomplish this.

The boiling point of the solvent, however, should be sufficiently remote from that of the diisocyanate formed to permit easy and complete separation of the finished product. Thus the boiling point of the solvent can be either higher or lower than that of the particular diisocyanate concerned. The use of inert solvents with high boiling points is desirable because the reaction time is considerably shortened thereby. This greatly diminishes the possibilities of self-polymerization of the diisocyanate molecules from long contact of the products at high temperatures.

The reaction of phosgene with diamine dihydrochloride must of necessity be carried out in solvents inert to the active hydrochloric acid gas, phosgene and diisocyanates. For this purpose hydrocarbons such as benzene, toluene and xylene have been used in those cases where the resultant carbonyl chlorides are sufficiently unstable at the boiling point of these solvents. Where still higher decomposition temperatures are required, chlorobenzene and o-dichlorobenzene or the higher alkylated benzenes such as t-butylbenzene or secondary amylbenzene are very effective. The precise choice of a solvent for any particular reaction depends on several factors including the type of diamine to be converted, the boiling point of the resultant diisocyanate, and the method of isolation to be used, e. g., crystallization or distillation.

Generally, the diisocyanates are isolated from the reaction mixture by first removing traces of hydrochloric acid and unreacted phosgene by gentle boiling with nitrogen purging. Distillation under reduced pressure generally removes the solvent first and the residue may then be distilled to any degree of purity. In some cases the diisocyanate may boil lower than the inert solvent used in which case conditions are arranged to take advantage of this. Under certain conditions, the reaction product (diisocyanate) need not be isolated as such but can be reacted directly in the inert solvent with alcohols, glycols, amines, etc., and the end product isolated by appropriate means.

These reactions may be carried out either in a batchwise or in a continuous manner and it is not intended to limit the process to any particular method of operation.

The herein described diisocyanates are of wide usage in chemical synthesis. They are especially useful in the preparation of polymeric materials. Other ways in which they are utilized include as blowing agents in plastics, in preparations of synthetic rubbers, as cross-linking compounds for polyester, polyamide, and polyesteramide rubbers, as adhesive intermediates, and as chemical intermediates for the preparation of polyurethanes.

The more detailed practice of the invention is illustrated by the following examples, wherein parts are given by weight unless otherwise specified. These examples and embodiments are illustrative only, and the invention is not in any way intended to be limited specifically thereto except as indicated by the appended claims.

EXAMPLE I

The diamines and diamine salts used as starting materials for the reactions to produce $C_8$ diisocyanates of Examples I through IV were prepared by the following method.

The initial selective dimerization reaction was carried out in a stirred reactor having a gas inlet tube extending into the body of the reaction mixture and a reflux condenser vented to a nitrogen atmosphere. This reactor system was purged with nitrogen and charged with 1000 parts of dimethyl ether, 3 parts (about 1.8 wt. percent based on the butadiene used) of para-terphenyl and 69 parts of sodium dispersed in 69 parts of isooctane. The average particle size of the sodium was 15 microns. A stream of gaseous butadiene amounting to a total of 168 parts was passed into the reactor over a 4-hour period while maintaining vigorous agitation and a reaction temperature at about −25° C. During this period the disodium derivatives of the $C_8$ butadiene dimers were formed.

Alternatively, this dimerization reaction was carried out in a ball mill as the attrition type apparatus using sodium chloride as the solid, friable attrition agent. The results and products were substantially the same as those obtained above, except that a faster reaction rate and a somewhat higher yield are obtained.

In either case, the reaction mixture containing the disodium derivatives as a slurry was carbonated by contacting it with an excess of solid carbon dioxide. After evaporation of excess $CO_2$, dimethyl ether and isooctane, a solid product consisting essentially of the sodium salts of the $C_{10}$ unsaturated dicarboxylic acids remained. An alkaline solution of the dicarboxylic acids was hydrogenated using a nickel catalyst.

The hydrogenated diacids thus obtained were precipitated by addition of mineral acid. The combined yield of 10-carbon atom diacids was 87% based on the sodium. The mixed diacids are essentially composed of sebacic acid, $\alpha,\alpha'$-diethyladipic acid, and $\alpha$-ethylsuberic acid in the approximate ratio of 4:1:5. These dibasic acids may be separated by any of a number of procedures involving extraction, recrystallization or distillation. For example, the entire mixture may be esterified, fractionally distilled, and the resultant diester fractions then hydrolyzed. By such a procedure the above reaction product yielded the following fractions:

I. 26 parts $\alpha,\alpha'$-diethyladipic acid
II. 131 parts $\alpha$-ethylsuberic acid
III. 87 parts sebacic acid Sebacic acid obtained as fraction III above (1010 parts) was placed into a three necked reaction flask fitted with gas inlet tube, stirrer, and vapor outlet leading to a water cooled condenser. The vapor outlet was arranged to permit the insertion of a thermometer directly into the flask. This flask was heated in an oil bath whose temperature was controlled by suitable electronic equipment actuated by the mercury column in the thermometer.

Heat was applied and dry ammonia gas introduced when the temperature reached 150° C. The temperature was permitted to rise to about 200° to 220° C. at which point it was held constant and the gas ($NH_3$) flow maintained for from 7 to 15 hours depending on the conversion desired. About 30 parts of $H_2O$ was obtained per mole of acid.

When enough water was collected to indicate the desired level of conversion, the molten charge was poured into flat metal pans which caused the crude amide to solidify in a few minutes. This solid was then comminuted to about 20 mesh and extracted for several hours with 2% sodium hydroxide solution. Filtration, followed by washing with methanol resulted, after drying, in the isolation of pure sebacamide, M. P. 210–212° C. in about 80% yield.

In another experiment, 360 parts of $\alpha$-ethyl suberic acid, fraction II, was reacted with $NH_3$ gas at 220° C. in the manner described above. After purification by leaching with excess N/2 alkali and washing with methanol, 177 parts of the diamide was obtained; M. P., 165–170° C.; yield, 49.6%.

In a third experiment, 202 parts of pure $\alpha,\alpha'$-diethyladipic acid (mixture of racemic and meso forms) prepared and isolated as fraction I, was treated with $NH_3$ gas at 200–220° C. for 7 hours. The reaction product was finely ground and treated with aqueous ammonia to remove acidic material, both unreacted and side reaction products. The ammonia insoluble diamide was washed with distilled water to remove all traces of ammonia. A final wash with methanol followed by air drying, gave 102 parts of pure diamide; 50% yield, melting range 235–270° C. (mixture of racemic and meso forms).

To prepare 1,8-diaminooctane, sebacamide obtained as described above was used directly. Into a reaction flask equipped with efficient stirring, provision for temperature control, and a thermometer was placed a solution of 452 parts (11.3 moles) of sodium hydroxide (40% excess) in 900 parts of water and 1200 parts ice. Bromine (352 parts, 2.2 moles) was added dropwise with vigorous stirring at such a rate that little if any free bromine was present at any time.

The temperature of the hypobromite solution was then raised to about 15° C. and 200 parts (1 mole) of finely powdered sebacamide was added as rapidly as possible. After the addition of sebacamide, the temperature of the reaction mixture rose gradually with the solution of all suspended matter. The final reaction temperature was about 60–65° C. Cooling, followed by continuous liquid-liquid extraction with ethyl ether, gave, after 8 hours, a yield of 71.5 parts of 1,8-diaminooctane; 50% yield; B. P. 94° C. at 1 mm. Hg. pressure. The amine can be isolated as the carbonate or dihydrochloride, if desired.

In another experiment, 177 parts of α-ethyl suberamide was added to a cold aqueous solution of (2000 parts) containing 326.4 parts bromine and 400 parts sodium hydroxide at 5° C. The reaction proceeded rapidly with the reaction mixture reaching a temperature of 75° C. in 30 minutes. After refluxing for 1 hour, the clear solution was subjected to continuous extraction with ether for 48 hours.

The ether extract was then heated to remove solvent and the product distilled under reduced pressure for the recovery of 1,6-diaminooctane. The yield was 100 parts of 1,6-diaminooctane; B. P. 75° C. at 1 mm. Hg pressure.

Into a reaction flask provided with stirrer, dropping funnel and thermometer, was introduced 226 parts (5.7 moles) sodium hydroxide dissolved in 450 parts water. A cold slurry of this alkali solution was made by adding 600 parts of crushed ice. To this slurry at −2° C., was added 176 parts (1.1 mole) liquid bromine. To the freshly prepared solution of cold hypobromite was then added 100 parts (0.5 mole) of the diamide of α,α′-diethyladipic acid. After 30 minutes, the temperature was permitted to rise to 40° C. spontaneously.

The reaction mixture was refluxed for 30 minutes, then cooled and filtered. There was recovered 6 parts of unreacted diamine. Continuous ether extraction for 16 hours gave, after solvent removal and distillation at 2 mm. Hg, 55 parts of 3,6-diaminooctane; 81.4% yield; B. P. 60° C.

Into a reaction flask fitted with reflux condenser and gas inlet was placed 50 parts of finely divided hydrochloride of 1,8-diaminooctane made as described above and about 400 parts by volume of sec-amyl benzene. At reflux temperature (187° C.) a slow stream of phosgene was maintained until all solid suspension has disappeared. This required 2 to 3 hours.

Nitrogen was passed through the hot solution to remove hydrochloric acid and phosgene gas. Fractional distillation removed the sec-amyl benzene solvent which can be reused. At 97° to 105° C. and 0.1 mm. Hg, a fraction of 34.0 parts of diisocyanate was obtained; yield 75.6%.

EXAMPLE II

Into a reaction flask fitted with reflux condenser and gas inlet was placed 50 parts of finely divided hydrochloride of 1,8-diaminooctane and about 400 parts by volume of dry xylene. At reflux temperature, phosgene was introduced and continuously added for 7 hours. After sweeping the reaction mixture out with nitrogen and cooling it, filtration gave a recovery of 12 parts of unconverted dihydrochloride. This indicated a conversion of diamine to diisocyanate of 76.2%. Distillation resulted in the recovery of 34.5 parts of corresponding diisocyanate boiling between 98–104° C. at 0.1 mm. Hg. This was a 76.8% yield.

EXAMPLE III

Into a reaction flask fitted with gas inlet and reflux condenser was placed 57.5 parts of 1,6-diaminooctane and about 700 parts by volume of xylene. Sufficient dry hydrochloric acid gas was added to convert this to the dihydrochloride.

Heat was then applied and the mixture refluxed. Phosgene gas was introduced through a dispersion tube for 72 hours. The homogeneous reaction mixture was boiled to remove dissolved phosgene, decolorized with activated carbon and xylene solution filtered. Fractionation at reduced pressure gave 51.0 parts of 1,6-diisocyanooctane; B. P. 85–88° C. at 0.1 mm. Hg; 80% yield. A sample of this diisocyanate was converted to the methyl urethane, M. P. 85.5–86° C. and as such gave the following analyses: Calculated for $C_{12}H_{24}O_4N_2$—C, 55.36; H, 9.29; N, 10.76; found—C, 55.29; H, 9.35; N, 10.73.

EXAMPLE IV 58.5 parts of the dihydrochloride of 3,6-diaminooctane were suspended in about 500 parts by volume of xylene and subjected to the action of phosgene at 140° C. for 24 hours.

The reaction mixture became homogeneous after that time. Removal of solvent, and distillation at reduced pressure gave 49.4 parts; B. P. 66–70° C. at 0.5 mm. Hg; yield 93.5%, of 3,6-diisocyanooctane. Analysis of the corresponding dimethyl urethane (M. P. 150–154° C.) gave the following results: Calculated for $C_{12}H_{24}O_4N_2$—C, 55.36; H, 9.29; N, 10.76; found—C, 55.38; H, 9.40; N, 10.85.

EXAMPLE V

The diamines and diamine salts used as starting materials for the reactions to produce $C_{10}$ diisocyanates of Examples V and VI were prepared by the following method.

A mixture of hydrogenated $C_{10}$ diacids consisting essentially of sebacic acid, α,α′-diethyladipic acid and α-ethylsuberic acid was obtained as described in the introduction to Example I.

These saturated mixed $C_{10}$ diacids were extracted with benzene to dissolve the branched-chain acids. The sebasic acid is relatively insoluble. The branched-chain acids were isolated by evaporation of the benzene.

A mixture of 120 parts of the $C_{10}$ acids (α-ethylsuberic, α,α′-diethyladipic and sebacic acids, in the ratio of 8:1:1, respectively) and 60 parts of urea were stirred vigorously for about 6½ hours at a temperature of 160° C. At the end of this time, the temperature was increased to 220° C. for 27 minutes. The products were distilled from the reaction vessel at atmospheric pressure until no more distillate was obtained, the maximum temperature being 340° C.

The distillate was taken up in excess diethyl ether and extracted with 5% ammonium hydroxide in order to remove any unreacted acidic products and by-product cyano acids. The ether solvent was removed and the crude ten carbon atom dinitriles distilled under reduced pressure. The fraction boiling at about 150–190° C./10 mm. gave 57 parts (58% yield) of the mixed dinitriles. Fractionation of this mixture gave 6 parts of α,α′-diethyladiponitrile, 36 parts of α-ethylsuberonitrile and 6 parts of sebaconitrile boiling at 195–198° C./15 mm., α,α′-diethyladiponitrile boils at 163–167° C./15 mm.; and α-ethylsuberonitrile boils at 184–186° C./15 mm.

Reduction of 82 parts of α-ethylsuberonitrile in liquid ammonia over Raney nickel gave 60 parts of the $C_{10}$ diamine, 2-ethyl-1,8-diaminooctane. The boiling point was 138–142° C./10 mm., and the melting point was 26–27° C. The diamine dihydrochloride melted at 160–161° C.

Reduction of 82 parts of α,α′-diethyladiponitrile in liquid ammonia over Raney nickel gave 60 parts of the $C_{10}$ diamine, 2,5-diethyl-1,6-diaminohexane, boiling at 106–110° C./6 mm. The diamine dihydrochloride melted at 154–156° C.

2-ethyl-1,8-diaminooctane, prepared by reduction of the corresponding dinitrile, was converted to the dihydrochloride. 81 parts of this compound was suspended in about 500 parts by volume of xylene and treated at 140° C. with phosgene as described above. After about 16 hours, the solution became clear.

This reaction mixture gave, on isolation as above, 70.1 parts of 2-ethyl-1,8-diisocyanooctane; B. P. 110–112° C. at 0.1 mm. Hg; 94.6% yield. A sample of this compound was converted to the dimethyl urethane (51.5–53° C.) and as such gave the following analyses: Calculated for $C_{14}H_{28}O_4N_2$—C, 58.3; H, 9.78; N, 9.71; found—C, 58.4; H, 9.77; N, 9.80.

EXAMPLE VI

The dihydrochloride of 2,5-diethyl-1,6-diaminohexane (24.5 parts) was suspended in 400 parts of dry xylene and raised to reflux temperature. A slow stream of phosgene was passed through the stirred suspension for 5 hours, during which time the reaction mixture became homogeneous. The preparation was distilled at atmospheric pressure to remove xylene and at 2 mm. pressure at which the 2,5-diethyl-1,6-diisocyanohexane was obtained as a water white liquid (B. P. 95–96° C.) in 55% yield, 11.3 gms.

*Analysis.*—Calculated for $C_{12}H_{20}N_2O_2$: C, 64.27%; H, 8.98%; N, 12.48%. Found: C, 64.57%; H, 9.03%; N, 12.23%.

Table I below summarizes the data obtained from the procedures for preparation of diisocyanates as described in the above examples.

isocyanates in which the isocyano (—NCO) groups are separated by at least 4 carbon atoms, which includes the steps of dimerizing butadiene in the presence of sodium in finely dispersed form in an active ether diluent and in the presence of at least one dimerization activator, immediately carbonating the resulting organometallic diene intermediate, neutralizing the resulting dialkali metal salts of dicarboxylic acids to obtain the free diacids, hydrogenating the unsaturated diacids, reacting the saturated diacids with at least one ammonia releasing agent to obtain the diamides, treating the diamides with alkaline hypohalite to give the diamines, and reacting the diamines with phosgene to obtain the $C_8$ diisocyanates.

2. The method of preparing saturated aliphatic $C_{10}$ diisocyanates in which the isocyano (—NCO) groups are separated by at least 6 carbon atoms, which includes the steps of dimerizing butadiene in the presence of sodium in finely dispersed form in an active ether diluent and in the presence of at least one dimerization activator, immediately carbonating the resulting organometallic diene intermediate, neutralizing the resulting dialkali metal salts of dicarboxylic acids to obtain the free diacids, hydrogenating the unsaturated diacids, heating the saturated diacids with at least one ammonia releasing agent to obtain the dinitriles, hydrogenating the resulting dinitriles to diamines, and reacting the diamines with phosgene to obtain the $C_{10}$ diisocyanates.

References Cited in the file of this patent

UNITED STATES PATENTS

| | | |
|---|---|---|
| 2,132,849 | Greenwalt et al. | Oct. 11, 1938 |
| 2,200,282 | Lazier | May 14, 1940 |

Table I
PREPARATION OF DIISOCYANATES

| Diisocyanate | Corresponding Diamine by— | Solvent | Time, hrs. | Temp., ° C. | B. P. at 1-2 mm., ° C. | Yield, Percent |
|---|---|---|---|---|---|---|
| 1,8-diisocyano-octane | Hypobromite | Toluene | 72 | 110 | | |
| Do | do | Xylene | 15 | 140 | 101–102 | 91.0 |
| Do | do | Sec-amyl benzene | 3 | 190 | 101–102 | 75.6 |
| 1,6-diisocyano-octane | do | Xylene | 18 | 140 | 85–88 | 80.0 |
| 3,6-diisocyano-octane | do | do | 16 | 140 | 66–70 | 93.5 |
| 2-ethyl-1,8-diisocyano-octane | Dinitrile | do | 21 | 140 | 110–112 | 86.8 |
| 2,5-diethyl-1,6-diisocyanohexane | do | do | 15 | 140 | 95–96 | 55.0 |

While there are above disclosed but a limited number of embodiments of the process and examples of the compounds of the invention herein presented, it is possible to produce still other embodiments without departing from the inventive concept herein disclosed, and it is desired therefore that only such limitations be imposed on the appended claims as are stated therein.

What is claimed is:

1. The method of preparing saturated aliphatic $C_8$ di-

| | | |
|---|---|---|
| 2,319,057 | Hanford | May 11, 1943 |
| 2,352,461 | Walker | June 27, 1944 |
| 2,394,597 | Dickey et al. | Feb. 12, 1946 |
| 2,584,527 | Albisetti et al. | Feb. 5, 1952 |
| 2,716,662 | Cohen et al. | Aug. 30, 1955 |

OTHER REFERENCES

Karrer: "Organic Chemistry," 4th English edition (1950), p. 130.